United States Patent [19]

Hiramatsu et al.

[11] Patent Number: 4,665,773
[45] Date of Patent: May 19, 1987

[54] CONTINUOUSLY VARIABLE TRANSMISSION APPARATUS FOR AUTOMOBILE

[75] Inventors: Takeo Hiramatsu; Bonnosuke Takamiya, both of Kyoto, Japan

[73] Assignee: Mitsubishi Jidosha Kogyo Kabushiki Kaisha, Tokyo, Japan

[21] Appl. No.: 710,070

[22] Filed: Mar. 11, 1985

[30] Foreign Application Priority Data

Mar. 13, 1984 [JP] Japan .................. 59-46431
Feb. 21, 1985 [JP] Japan .................. 60-33461

[51] Int. Cl.⁴ .................................. B60K 41/12
[52] U.S. Cl. ........................... 74/866; 74/867; 192/0.076
[58] Field of Search .......... 74/859, 853, 856, 866, 74/865, 867; 192/0.076, 103 R, 3.58, 3.57, 0.096, 0.033, 0.075; 474/12, 18

[56] References Cited

U.S. PATENT DOCUMENTS

| | | | |
|---|---|---|---|
| 2,828,642 | 4/1958 | Bernard | 74/856 |
| 3,335,830 | 8/1967 | De Coye De Castelet | 74/859 |
| 3,896,910 | 7/1975 | Audiffred et al. | 192/3.57 |
| 4,232,561 | 11/1980 | Kashihara et al. | 74/191 |
| 4,401,200 | 8/1983 | Heidemeyer et al. | 192/0.096 X |
| 4,457,411 | 7/1984 | Hiramatsu | 192/3.31 X |
| 4,466,311 | 8/1984 | Hiramatsu | 74/866 |
| 4,466,521 | 8/1984 | Hattori et al. | 192/0.076 X |
| 4,529,072 | 7/1985 | Oguma et al. | 192/3.58 X |

FOREIGN PATENT DOCUMENTS 0160454 12/1981 Japan ...................... 74/867

*Primary Examiner*—Allan D. Herrmann
*Assistant Examiner*—David Novais

[57] ABSTRACT

In a continuously variable transmission apparatus for a vehicle having a slip type clutch disposed between a drive shaft of an engine and an input shaft of a continuously variable transmission mechanism, a torque detecting device to detect torque of the engine, an engine speed detecting device to detect rotational speed of the engine, an output shaft speed detecting device to detect rotational speed of an output shaft of the slip type clutch, a vehicle speed detecting device to detect running speed of the vehicle, and an electronic control device to control the continuously variable transmission mechanism and the slip type clutch according to signals from the detecting devices are provided. The slip type clutch control device is controlled to give a reference amount of slip determined according to driving condition of the vehicle, and speed ratio of the continuously variable transmission mechanism is controlled to a value determined primarily on the basis of control signal of the slip type clutch.

9 Claims, 11 Drawing Figures

SIGNAL PRESSURE

Fig.11

CONTINUOUSLY VARIABLE TRANSMISSION APPARATUS FOR AUTOMOBILE

BACKGROUND OF THE INVENTION

1. Field of the Invention

This invention relates to a power transmission apparatus using a continuously variable transmission mechanism for an automobile.

2. Description of the Prior Art

In a torque converter so far often used for an automatic transmission apparatus of an automobile, there occurs substantial slip between its input shaft and output shaft. This type of transmission mechanism has been defective in that its power transmission efficiency is low and fuel efficiency, or mileage, of the automobile is difficult to improve.

Therefore, a continuously variable transmission mechanism having a relatively high power transmission efficiency draws attention for use as a power transmission apparatus for an automobile. It is generally known that power transmission efficiency of the continuously variable transmission mechanism is greatly varied with speed ratio of input and output shafts, rotational speed of input shaft and input shaft torque, high efficiency in low rotational speed and high torque range, while that of a conventional change gear transmission system is almost constant under all conditions (only depending on gear type and the number of engaging teeth). Further, the continuously variable transmission mechanism is more flexible in setting the range of speed ratio as compared with the change gear transmission system, and the speed ratio can be continuously varied within the range. Therefore, the continuously variable transmission mechanism is theoretically advantageous over the change gear transmission system in view of the fuel efficiency and acceleration performance. Especially for the fuel efficiency, in the conventional change gear transmission system, the speed ratio is specified correspondingly to a given engine output power and vehicle speed, so the fuel efficiency is inevitably decided. On the other hand, in the continuously variable transmission mechanism, the engine can be operated at a lower speed and a higher torque to obtain the above engine output and vehicle speed by selecting a lower speed ratio, thereby providing maximum fuel efficiency.

However, in a reciprocating engine, there occurs a torque fluctuation caused by the inertia of reciprocating motion of the piston and a fluctuation of pressure in the combustion chamber. Therefore, the crankshaft of the engine rotates being accompanied with the fluctuation in torque and the fluctuation in the rotation speed. Such fluctuation in torque affects the drivability of a vehicle. Especially, when the engine is operated at a low speed, the fluctuation in torque is transmitted to the body and drive shaft of the vehicle, and the lower limit of operation speed of the engine is substantially increased because of vibration due to fluctuation in torque, even if the average drive torque is sufficient to drive the vehicle As a result, there occurs a problem in that, even if the above described continuously variable transmission mechanism is used, the speed ratio must be selected to a substantially large value, resulting in reduced fuel efficiency.

Further, in a conventional belt type continuously variable transmission mechanism in which belt pressing force of the driven pulley is set to a constant value there occurs a problem in that the belt pressing force is excessive for partial load operation resulting in reduced transmission efficiency and shortened life of the belt, and the belt tends to slip at the time of starting the vehicle causing accelerated wearing of the belt.

SUMMARY OF THE INVENTION

A first object of the present invention is to provide a continuously variable transmission apparatus for a vehicle having a continuously variable transmission mechanism, which fully utilizes advantageous functions of the continuously variable transmission mechanism for improved fuel efficiency. A second object of the present invention is to provide a continuously variable transmission apparatus in which the continuously variable transmission mechanism is controlled by control signal of a slip type clutch for exact and optimum speed ratio control. A third object of the present invention is to provide a continuously variable transmission apparatus using a belt type continuously variable transmission mechanism in which slip of belt at the time of starting the vehicle is minimized, thereby preventing accelerated wearing and damage of the belt.

In accordance with the present invention which attains the above objects, a first invention provides a continuously variable transmission apparatus for a vehicle having a slip type clutch disposed between a drive shaft of an engine and an input shaft of a continuously variable transmission mechanism, comprising a torque detecting device to detect torque of the engine, an engine speed detection device to detect rotational speed of the engine, an output shaft speed detecting device to detect rotational speed of an output shaft of the slip type clutch, a vehicle speed detecting device to detect running speed of the vehicle, and an electronic control device to control the continuously variable transmission mechanism and the slip type clutch according to signals from the detecting devices, and characterizing in that: means for determining an actual amount of slip of the slip type clutch from output signals of the engine speed detecting device and the output shaft speed detecting device, means for determining a slip amount difference between a reference amount of slip predetermined according to running condition of the vehicle and the actual amount of slip, a control device for the slip type clutch being controlled according to the slip amount difference so as the actual amount of slip becomes closer to the reference amount of slip, means for determining an actual speed ratio of the continuously variable transmission mechanism from output signal of the engine speed detecting device or output shaft speed detecting device and output signal of the vehicle speed detecting device, means for determining a speed ratio difference between a reference speed ratio set according to control signal of the control device for the slip type clutch and signal from the engine speed detecting device or the vehicle speed detecting device and the actual speed ratio, a control device for controlling speed ratio of the continuously variable transmission mechanism according to the speed ratio difference, a second invention provides a continuously variable transmission apparatus for a vehicle having a slip type clutch disposed between a drive shaft of an engine and an input shaft of a belt type continuously variable transmission mechanism, comprising a torque detecting device to detect torque of the engine, an engine speed detecting device to detect rotational speed of the engine, an output shaft speed detecting device to detect rotational speed of an output shaft of the slip type clutch, a vehicle speed detecting device to detect running speed of the vehicle, and an electronic control device to control the belt type continuously variable transmission mechanism and the slip type clutch according to signals from the detecting devices, and characterizing in that: means for determining an actual amount of slip of the slip type clutch from output signals of the engine speed detecting device and the output shaft speed detecting device, means for determining a slip amount difference between a reference amount of slip predetermined according to running condition of the vehicle and the actual amount of slip, a control device for the slip type clutch being controlled according to the slip amount difference so as the actual amount of slip becomes closer to the reference amount of slip, and a control device for controlling belt pressing force of a driven pulley of the belt type continuously variable transmission mechanism according to the control signal of the control device for the slip type clutch, and a third invention provides a continuously variable transmission apparatus for a vehicle having a slip type clutch disposed between a drive shaft of an engine and an input shaft of a belt type continuously variable transmission mechanism, comprising a torque detecting device to detect torque of the engine, an engine speed detecting device to detect rotational speed of the engine, an output shaft speed detecting device to detect rotational speed of an output shaft of the slip type clutch, a vehicle speed detecting device to detect running speed of the vehicle, and an electronic control device to control the belt type continuously variable transmission mechanism and the slip type clutch according to signals from the detecting devices, and characterizing in that: means for determining an actual amount of slip of the slip type clutch from output signals of the engine speed detecting device and the output shaft speed detecting device, means for determining a slip amount difference between a reference amount of slip predetermined according to running condition of the vehicle and the actual amount of slip, a control device for the slip type clutch being controlled according to the slip amount difference so as the actual amount of slip becomes closer to the reference amount of slip, a control device for controlling belt pressing force of a driven pulley of the belt type continuously variable transmission mechanism being controlled according to the control signal of the control device for the slip type clutch, means for determining an actual speed ratio of the belt type continuously variable transmission mechanism from output signal of the engine speed detecting device or the output shaft speed detecting device and output signal of the vehicle speed detecting device, means for determining a speed ratio difference between a reference speed ratio set according to the control signal of the control device for the slip type clutch and signal from the engine speed detecting device or the vehicle speed detecting device and the actual speed ratio, and a control device for controlling belt pressing force of the driven pulley of the belt type continuously variable transmission mechanism according to the speed ratio difference, thereby controlling the speed ratio.

By virtue of such arrangements, drive torque of an engine which rotates with in torque fluctuation, such as in a reciprocating piston engine, is transmitted through the slip type clutch to the continuously variable transmission mechanism, and the slip type clutch is controlled so that the output shaft of the slip type clutch is rotated at a speed lower by a predetermined amount of slip than the engine speed. Thus, torque fluctuation of the engine and vibration resulting from the torque fluctuation are not transmitted to the continuously variable transmission mechanism, thereby only desired flat torque being transmitted to the continuously variable transmission mechanism. This permits the lower limit of engine speed to be reduced. As a result, the range of low rotational speed and high torque for higher transmission efficiency can be fully utilized, thereby improving the fuel efficiency.

The control signal for the slip type clutch control device represents the pressing force of the clutch pressure, that is torque itself transmitted by the clutch. By using said control signal for controlling the speed ratio, more exact and optimum proportional control of the speed can be accomplished as compared with a conventional method in which throttle opening of the engine or negative pressure in the intake manifold is used as the representing value of transmitted torque.

Further, by controlling the belt pressing force of the driven pulley of the belt type continuously variable transmission mechanism according to the above described control signal, the belt pressing force of the driven pulley can be controlled according to the transmitted torque, thereby preventing decrease in power transmission efficiency, increase in power loss and shortening of durability of the belt.

Moreover, since a prescribed slip occurs in the slip type clutch at starting the vehicle, the vehicle can be started smoothly and slip between the belt and the driven pulley, which is liable to occur in a belt type continuously variable transmission mechanism, can be prevented, thereby preventing accelerated wearing of the belt and improving durability thereof.

DESCRIPTION OF THE PREFERRED EMBODIMENTS

A first embodiment of the present invention will be described in detail with reference to FIGS. 1 through 6.

Figure 1:
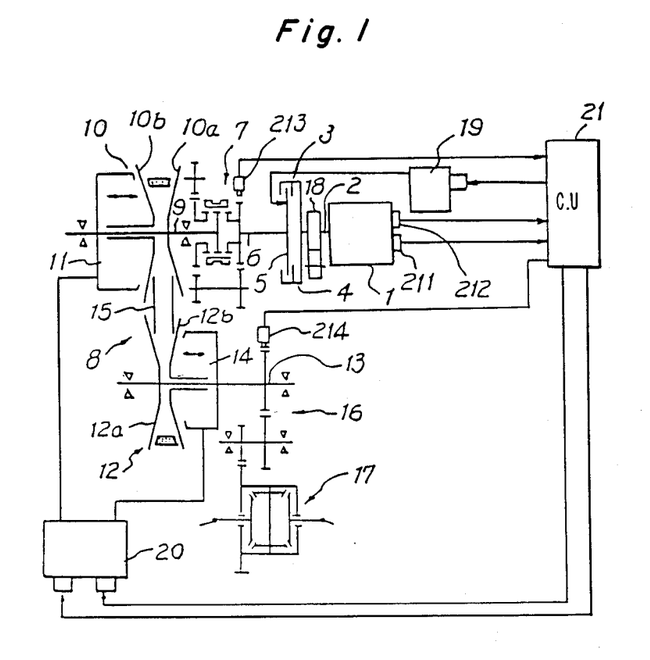
FIG. 1 is a diagrammatic view showing schematically the structure of a first embodiment of the continuously variable transmission apparatus according to the present invention.

In this embodiment, a belt type continuously variable transmission mechanism is used as a continuously variable transmission mechanism. A drive shaft 2 of an engine 1 is coupled to a fly wheel 4 of a slip type clutch 3. An output shaft 6 of the clutch 3, which slidably supports a clutch disk 5 being pressed against the fly wheel 4 by a hydraulic oil pressure, is connected to a gear change mechanism 7 comprising a known gear train and a shift sleeve for changing over forward and reverse running of the vehicle. The gear change mechanism 7 is operated directly by a known select lever disposed in the passenger room (not shown), or indirectly through a hydraulic actuator or the like, and its output side is coupled to an input shaft 9 of a belt type continuously variable transmission mechanism 8. A disk 10a of a disk pair on a driving pulley 10 of the belt type continuously variable transmission mechanism 8 is integrally fixed to the input shaft 9, and the other disk 10b of the disk pair is spline engaged, slidably in the axial direction, with the input shaft 9. The disk 10b is slid in the axial direction by hydraulic oil pressure supplied to a hydraulic chamber 11 formed on the backside of the disk 10b. A driven pulley 12 of the belt type continuously variable transmission mechanism 8 comprises a disk 12a which is integrally fixed to an output shaft 13 and a disk 12b which is slidably engaged by a spline with the output shaft 13. The disk 12b is slid in the axial direction by hydraulic oil pressure supplied to a hydraulic oil chamber 14 formed on the backside of the disk 12b. A steel or rubber belt 15 is installed between the two pulleys 10 and 12. Speed ratio of the belt type continuously variable transmission mechanism 8 can be continuously changed within a predetermined range by varying distances between disks 10a and 10b and between disks 12a and 12b of the pulleys 10 and 12 respectively, thereby varying the effective radii of the pulleys. The speed ratio of the belt type continuously variable transmission mechanism 8 is controlled by varying the pressing force of the driving pulley 10 applied to the belt 15, that is, controlling hydraulic oil pressure applied to the hydraulic oil chamber 11. Transmission torque of the belt type continuously variable transmission mechanism 8 is controlled by varying the pressing force of the driven pulley 12 applied to the belt 15, that is, changing hydraulic oil pressure applied to the hydraulic oil chamber 14. Driving force from the output shaft 13 is transmitted through a reducing mechanism 16 to a differential unit 17 connected to driving wheels which are not shown.

The slip type clutch 3 and the belt type continuously variable transmission mechanism 8 are operated by hydraulic pressure generated in an hydraulic oil pump 18 connected to the drive shaft 2 of the engine 1, and are controlled by electrohydraulic control devices 19 and 20 respectively. The electrohydraulic control devices 19 and 20 control the slip type clutch 3 and the continuously variable transmission mechanism 8 according to control signal from an electronic control device 21. The electronic control device 21 receives signals from a know engine speed detecting device 211 which detects rotational speed of the engine 1 by directly measuring rotational speed of the drive shaft 2 of the engine 1 or by counting the number of pulses of an ignition device of the engine 1, a valve opening sensor 212 which detects opening of a throttle valve disposed in an intake system, which is not shown, of the engine 1, an output shaft speed detecting device 213 which detects rotational speed of the output shaft 6 of the slip type clutch 3, a vehicle speed detecting device 214 which detect running speed of the vehicle by detecting rotation speed of the output shaft 13 of the belt type continuously variable transmission mechanism 8, a lever position detecting device which detects the position of the select lever, and a temperature sensor which detects temperature of the engine 1.

Figure 2:
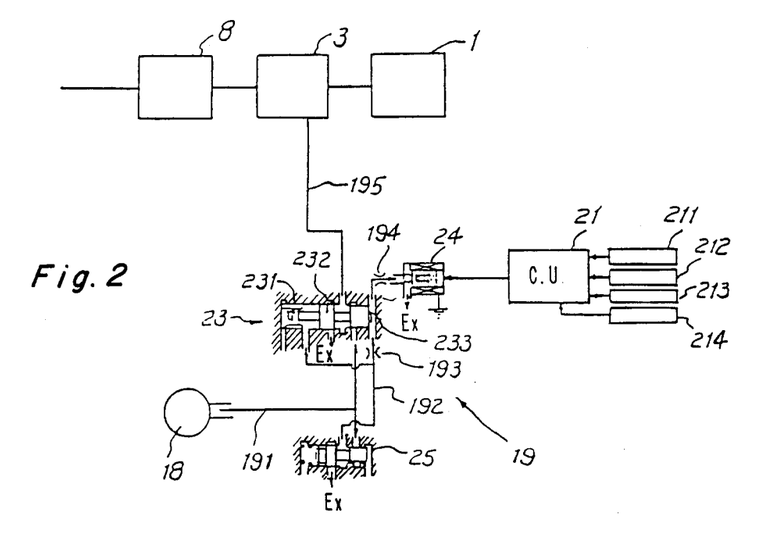
FIGS. 2 and 3 are detailed views showing part of the continuously variable transmission apparatus in the first embodiment of the present invention.

FIG. 2 shows an example of the electrohydraulic control device 19 to control operation of the slip type clutch 3. The electrohydraulic control device 19 comprises an oil pressure control valve 23, an electromagnetic valve 24 controlled by the electronic control device 21, and a pressure adjusting valve 25. Hydraulic oil pressure generated by the hydraulic oil pump 18 shown in FIG. 1 is regulated to a predetermined value (line pressure) by means of a known pressure regulating valve which is not shown, and is then supplied to the oil pressure control valve 23 and pressure adjusting valve 25 through a hydraulic oil passage 191. Hydraulic oil pressure supplied to the pressure adjusting valve 25 is reduced to a predetermined low pressure as a signal pressure for controlling the oil pressure control valve 23, and is then supplied between two lands 231 and 232, of which difference between pressure receiving areas is preset, of the oil pressure control valve 23 through a hydraulic oil passage 192, and to a pressure receiving surface 233 through an orifice 193. The downstream end of the orifice 193 is connected to an opening part through an orifice 194, and provided with the electromagnetic valve to control the opening and the closing of the opening part. The electromagnetic valve 24, which is a normal closing type electromagnetic valve, is duty-controlled by the electronic control device 21. The electromagnetic valve 24 controls ratio of opening and closing time of the opening part by varying pulse width in a period of pulse current of constant frequency (hereinafter called "duty ratio"), thereby controlling hydraulic oil pressure at the orifice 193 downstream, that is signal pressure acting on the pressure receiving surface 233. This signal pressure controls the oil pressure control valve 23 to control the value and turning-on and -off of hydraulic oil pressure supplied to the slip type clutch 3 through the hydraulic oil passage 191, the hydraulic control valve 23 and the hydraulic oil passage 195.

Figure 3:
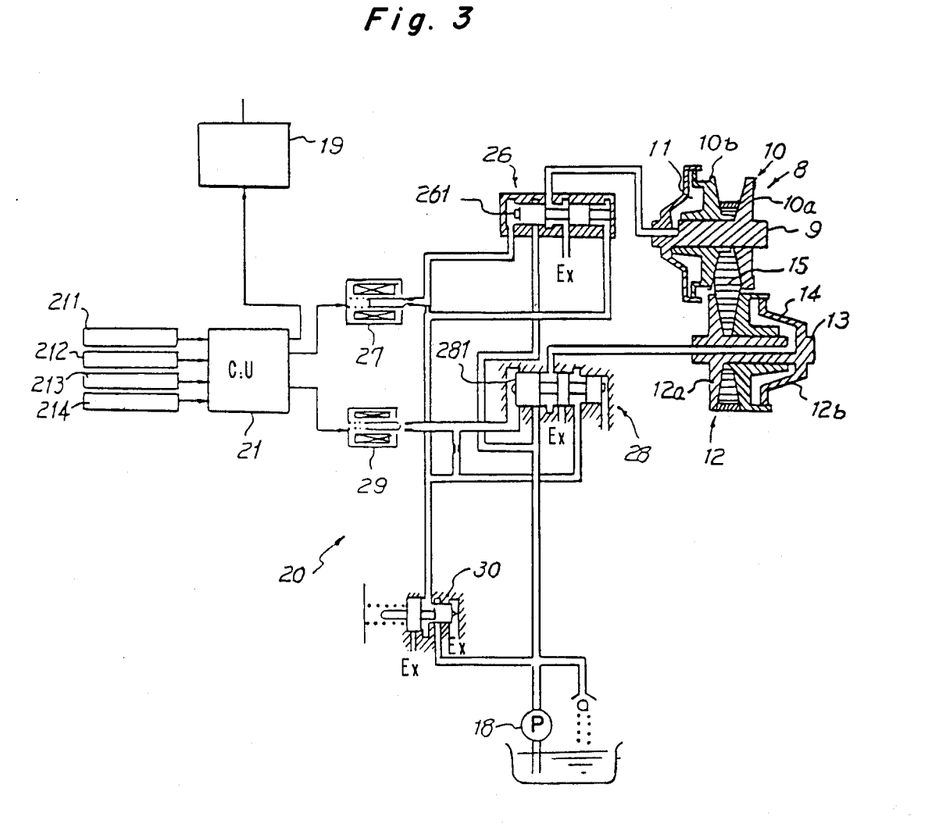

FIG. 3 shows an example of an electrohydraulic control device 20 for the belt type continuously variable transmission mechanism 8. The electrohydraulic control device 20 comprises a speed ratio control valve 26 to vary the speed ratio by controlling hydraulic oil pressure supplied to the hydraulic oil chamber 11 of the driving pulley 10, a electromagnetic valve 27 to control a signal pressure acting on a pressure receiving surface 261 of the speed ratio control valve 26 by varying the duty ratio, a pressing force control valve 28 to control the belt pressing force of the pulley by controlling hydraulic oil pressure supplied to the hydraulic oil chamber 14 of the driven pulley 12, an electromagnetic valve 29 to control the signal pressure acting on a pressure receiving surface 281 of the belt pressing force control valve 28 by varying the duty ratio, in the same structure as for the electromagnetic valves 24 and 27, and a pressure adjusting valve 30 to reduce the hydraulic oil pressure of a predetermined value (line pressure) supplied from the hydraulic oil pump through a pressure regulating valve to a predetermined low pressure in order to obtain the signal pressure.

Hydraulic control circuits of the both control devices 19 and 20 can be formed within the same casing. In this case, a single pressure regulating valve can be used commonly for the both hydraulic control circuits, and the pressure adjusting valves 25 and 30 for obtaining the signal pressure can also be a single valve for common use.

Figure 4:
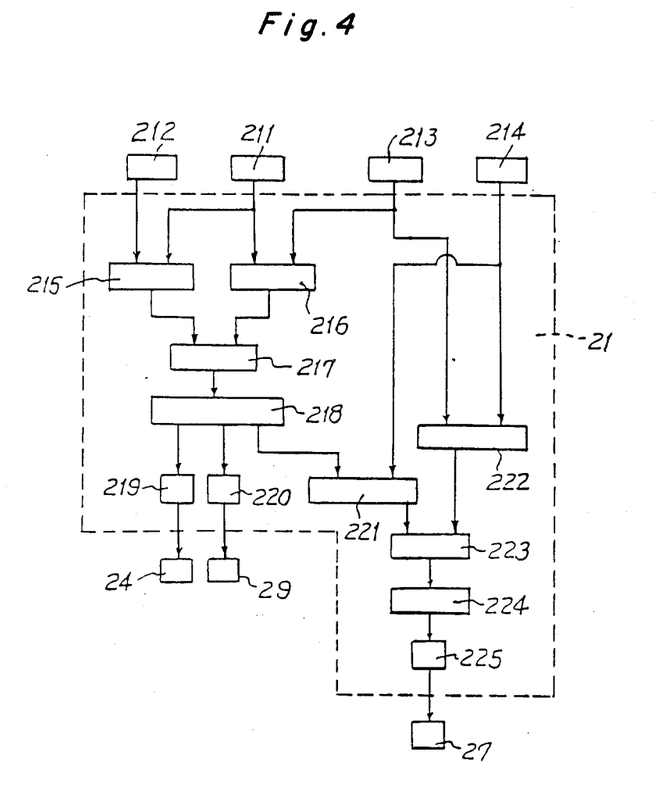
FIG. 4 is an electrical circuit diagram showing detail structure of the first embodiment of the continuously variable transmission apparatus according to the present invention.

The electronic control device 21 to transmit control signals to the electrohydraulic control devices 19 and 20 will be described with reference to FIG. 4. Throttle valve opening signal representative of engine torque from the valve opening sensor 212 and engine speed signal from the engine speed detecting device 211 are inputted to a reference slip amount calculation circuit 215 which calculates a reference amount of slip of the slip type clutch 3 from the above signals according to driving conditions of the vehicle. Signal from the engine speed detecting device 211 is also inputted to an actual slip amount calculation circuit 216. The actual slip amount calculation circuit 216 compares the engine speed signal with output shaft speed signal inputted from the output shaft speed detecting device 213 to determine an actual amount of slip in the slip type clutch 3. Signals from the both calculation circuits 215 and 216 are inputted to a slip difference calculation circuit 217 which calculates difference between the both amounts of slip, and the calculation result is inputted to a duty ratio calculation circuit 218. Based on current duty ratio setting and the calculation result from the slip difference calculation circuit 217, the duty ratio calculation circuit 218 calculates a duty ratio to be set for the next step, and a new duty ratio set on the basis of the calculation result is indicated to a drive circuit 219. Then, the drive circuit 219 drives the electromagnetic valve according to the indicated duty ratio. Thus, the actual amount of slip in the slip type clutch is feedback-controlled so that it converges to the reference amount of slip determined according to the driving condition of the vehicle. Details of the above control have been already described in the Specification of U.S. Pat. No. 4,457,411 applied by the same applicant as of the present invention, and not described here in detail.

Figure 5:
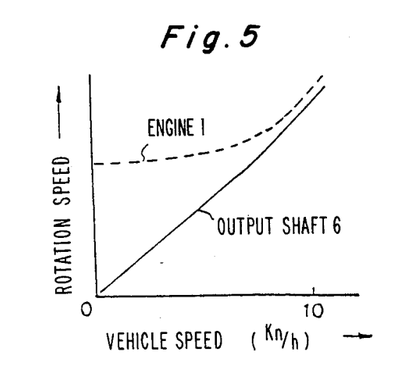
FIGS. 5 and 6 are graphics showing operation principles of the first embodiment of the present invention.
Figure 6:
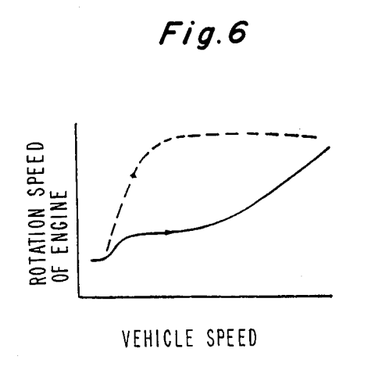

At the start of a vehicle with a speed of 0 to 10 km/hour, in the reference slip amount calculation circuit 215, the reference amount of slip may be set so that difference between engine speed and rotational speed of the output shaft 6, i.e. actual amount of slip, varies according to the vehicle speed as shown in FIG. 5, and so that the torque capacity of the clutch 3 is proportional to the square of the engine speed. However, this method can result in a delay of feedback control. Therefore, a starting duty ratio setting circuit is provided separately from the reference slip amount calculation circuit 215, and duty ratio to give the variation response according to the vehicle speed as shown in FIG. 5 is previously stored in the starting duty ratio setting circuit. At the start of the vehicle, the clutch 3 is open-loop controlled using the stored duty ratio, and when the vehicle is in stationary driving condition, the amount of slip can be feedback-controlled by the reference slip amount calculation circuit 215, thereby providing good response of starting control.

The duty ratio set by the duty ratio calculation circuit 218 is indicative of the oil pressure of clutch 3 to obtain the reference amount of slip, and it represents the current torque transmission amount itself in the clutch 3. Thus, throttle valve opening transmitted from the valve opening sensor 212, which is used for setting the reference amount of slip, is a value indicative of the engine torque. But, the value does not give the substantial engine torque because of mounting error of the sensor or variation in engine output due to time effect or warming-up condition, much less it represents a torque transmitted through the clutch to the transmission mechanism. However, hydraulic oil pressure applied to the clutch 3 to obtain the reference amount of slip is proportional to a torque transmitted by the clutch (torque inputted to the transmission), and relation between the hydraulic oil pressure and signal of the control device, that is duty ratio, is readily determined in the system. Therefore, the signal, that is the duty ratio determined by the duty ratio calculation circuit 218, represents the substantial torque transmitted to the continuously variable transmission mechanism 8.

Therefore, the duty ratio for controlling the slip type clutch 3 calculated in the duty ratio calculation circuit 218 is indicated to a drive circuit 220, and the electromagnetic valve 29 is driven by the drive circuit 220 according to the indicated duty ratio, thereby properly controlling the belt pressing force of the driven pulley according to the transmission torque. (However, it may be necessary to adequately modulate the duty ratio according to difference in characteristics of hydraulic control circuit and transmission efficiency of the continuously variable transmission mechanism 8.)

The duty ratio is also inputted to a reference speed ratio calculation circuit 221 for setting the speed ratio of the belt type continuously variable transmission mechanism 8. In the reference speed ratio calculation circuit 221, an optimum speed ratio for the current driving condition is determined according to the above duty ratio and the value of the vehicle speed signal from the vehicle speed detecting device 214. The vehicle speed signal from the vehicle speed detecting device 214 is also inputted to an actual speed ratio calculation circuit 222, in which an actual speed ratio is calculated by comparing the vehicle speed signal with the rotational speed signal of the output shaft 6 from the output shaft speed detecting device 213. Signals indicating the calculation results of the calculation circuits 221 and 222 are inputted to a speed ratio difference calculation circuit 223 which calculates difference between the reference speed ratio and the actual speed ratio, and the calculation result of the speed ratio difference calculation circuit 223 is inputted to a duty ratio calculation circuit 224. The duty ratio calculation circuit 224 calculates a duty ratio to be set in the next step based on the current duty ratio setting and the calculation result from the circuit 223. A new duty ratio determined from the calculation result of the duty ratio calculation circuit 224 is indicated to the drive circuit 225 which then drives the electromagnetic valve 27 according to the indicated duty ratio. As a result, hydraulic oil pressure supplied to the hydraulic oil chamber 11 of the driving pulley 10 is controlled to adjust the effective radius of the driving pulley 10, thereby controlling the speed ratio of the belt type continuously variable transmission mechanism 8 to the optimum value. Thus, the speed ratio of the belt type continuously variable transmission mechanism 8 is feedback-controlled according to the driving condition of the vehicle.

The speed ratio can be changed in various patterns according to the driving condition of the vehicle. When the fuel efficiency of the vehicle is regarded as important, pattern of speed ratio may be set so that the engine speed varies relative to the vehicle speed as shown by the solid line in FIG. 6. If the running performance of the vehicle is important, pattern of speed ratio may be set so that the engine speed varies as shown by the broken line in FIG. 6. Also, the both patterns can be stored in the electronic control device 21 to allow either pattern to be selected according to driver's choice or road conditions.

According to the first embodiment of the present invention, engine torque fluctuation and vibration resulting therefrom are not transmitted to the continuously variable transmission mechanism 8 owing to the function of the slip type clutch 3, and the continuously variable transmission mechanism 8 is supplied with only desired flat torque, permitting the lower limit of the engine speed to be reduced. Therefore, low rotational speed/high torque range, where a high transmission efficiency of the continuously variable transmission mechanism 8 is obtained, can be utilized very efficiently, thereby improving the fuel efficiency of the vehicle. Use of the slip type clutch 3 also eliminates the need of a transmission system such as torque converter, permitting the entire transmission mechanism to be light in weight and compact in structure.

Further, since the duty ratio for controlling the slip type clutch 3 is used to control the speed ratio, more exact and ideal speed ratio control can be accomplished without using a torque sensor which is not in a practical stage as yet, as compared with a conventional method in which the throttle opening or negative pressure in the intake manifold is used to control the speed ratio.

Since the duty ratio can also be used to control the belt pressing force of the driven pulley 12, the belt pressing force can be positively controlled with a very simple structure and according to the transmission torque, thereby preventing reduction of transmission efficiency especially in partial load operation range, increased power loss and accelerated wearing of the belt.

Furthermore, since a predetermined slip occurs in the slip type clutch 3 at the starting of the vehicle, slip between the belt and the driven pulley 12 which is liable to occur at the start of the vehicle is prevented resulting in reduced wearing and improved durability of the belt, and smooth start of the vehicle is obtained.

According to the first embodiment of the present invention, various advantageous effects can be obtained as mentioned above.

While in the first embodiment of the present invention, the reference amount of slip is calculated from engine speed and the reference speed ratio from vehicle speed, it is also possible to calculated the reference amount of slip from vehicle speed and the reference speed ratio from engine speed.

The first embodiment of the present invention has been described with the use of the electronic control device 21 as a circuit component. However, it is needless to say that the control device can be a digital computer and all the control functions can be accomplished by programs thereof.

A second embodiment of the present invention will now be described in detail with reference to FIGS. 7 through 11. In the second embodiment, the same reference numerals are used to designate the substantially same parts appearing in the first embodiment.

Figure 8:
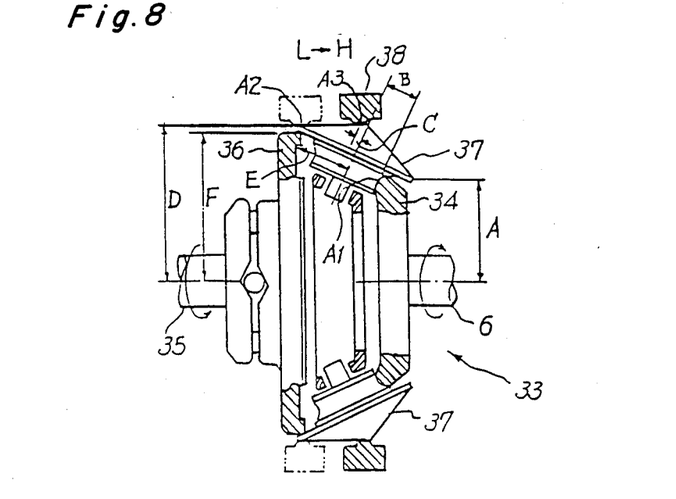
FIG. 8 is a schematic sectional view showing the structure of the continuously variable transmission mechanism in the second embodiment of the present invention.

The second embodiment of the present invention uses a frictional type continuously variable transmission mechanism 33 which has been disclosed in U.S. Pat. No. 4,232,561. Referring to FIG. 8, the frictional type continuously variable transmission mechanism 33 comprises a plurality of rotatable planetary cones 37 which contact with an input disk 34 integrally coupled to an input shaft (that is the output shaft 6 of the slip type clutch 3) and with a cam disk 36 coupled to an output shaft 35 of the continuously variable transmission mechanism 33, and a ring 38 contacting with cone surfaces of the planetary cones 37 and movable in the axial direction. In the Figure, A1, A2 and A3 are contact surfaces (transmission surfaces) of the planetary cones with the input disk 34, the cam disk 36 and the ring 38. When the input disk 34 integrally coupled with the input shaft 6 rotates, the planetary cones 37 turn around along the inner peripheral of the ring 38, while rotating on their axes. When the ring 38 is at position L shown by broken lines in the Figure, relation of the ring 38 to the planetary cones 37 is the same as that of the cam disk 36 to the planetary cones 37 ($D/C=F/E$). As a result, the cam disk 36 does not rotate, and no torque is transmitted. When the ring 38 is slightly moved to H side by a speed change operation, the cam disk 36 rotates slowly by effect of differential phenomenon. When the ring 38 comes at the position of H in the Figure, the cam disk 36 rotates at the maximum speed.

Figure 7:
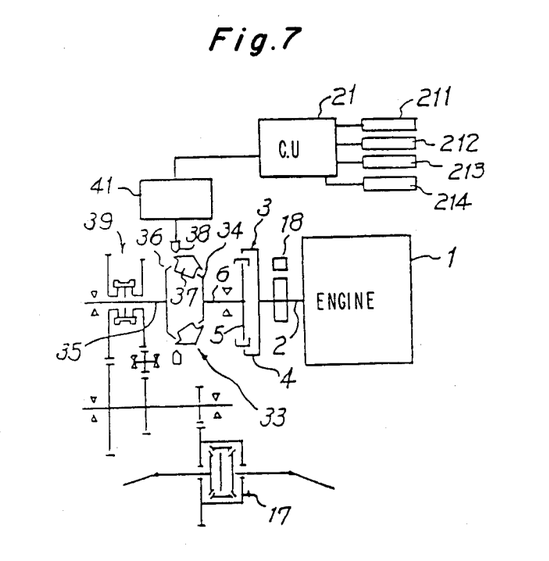
FIG. 7 is a diagrammatic view showing schematically the structure of a second embodiment of the continuously variable transmission apparatus according to the present invention.

In the second embodiment of the present invention, other arrangements are almost same as those of the first embodiment of the present invention, provided, however, that the output shaft 35 rotates in reverse relation to the input 6 in the frictional type continuously variable transmission mechanism 33, and a gear select mechanism 39 for selecting forward/reverse running is connected to the output shaft 35 in the reverse direction to that in the first embodiment of the present invention.

In this embodiment, the frictional type continuously variable transmission mechanism 33 can start from zero rotation, thereby permitting smooth start without complex clutch control. Owing to its wide range of reduction ratio (for example, infinite to 1.69), no separate reducer is required, providing compact structure.

Figure 9:
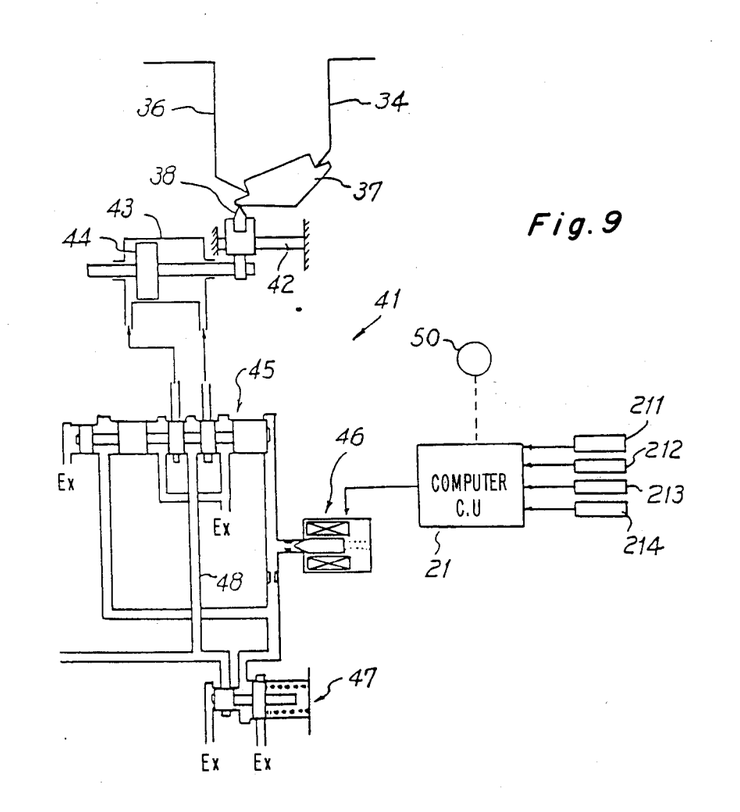
FIG. 9 is a detailed view showing part of the second embodiment of the present invention.

Further, in the second embodiment of the present invention, the speed ratio of the frictional type continuously variable transmission mechanism 33 can also be controlled by duty ratio for controlling the slip type clutch 3 and vehicle speed (or engine speed). In this case, the electronic control device 21 and the electrohydraulic control device 41 are same as those used in the first embodiment, the belt pressing force control valve 28 to control belt pressing force of the driven pulley, the electromagnetic valve 29 and the drive circuit 220 are eliminated, and other components are unchanged. An example of its electrohydraulic control device 41 is shown in FIG. 9. The ring 38 of the frictional type continuously variable transmission mechanism 33 is slidably supported by a guide 42 so that the ring 38 is movable in the axial direction, and a piston 44 of a hydraulic actuator 43 is coupled to the ring 38. A speed ratio control valve 45 to select and control hydraulic oil pressure supplied to the hydraulic actuator 43, an electromagnetic valve 46 to control the speed ratio control valve 45, and a pressure control valve 47 to control the signal pressure operate in the same way as in the components related to the speed ratio control valve 26 in the first embodiment of the present invention. In the Figure, numeral 48 indicates a hydraulic oil passage for line pressure. With such an arrangement, the electromagnetic valve 46 is duty-controlled by the electronic control device 21 according to the vehicle speed and the duty ratio for controlling the slip type clutch 3, the speed ratio control valve 45 is operated, the piston 44 of the hydraulic actuator 43 is moved, and the position of the ring 38 is changed to vary the speed ratio.

In this embodiment, if a malfunction occurs in the electrohydraulic control device 41, a self-diagnostic function of the electronic control device 21 will notify the driver by an indicator lamp 50 or a warning buzzer and permit the driver to make manual speed change control.

Figure 10:
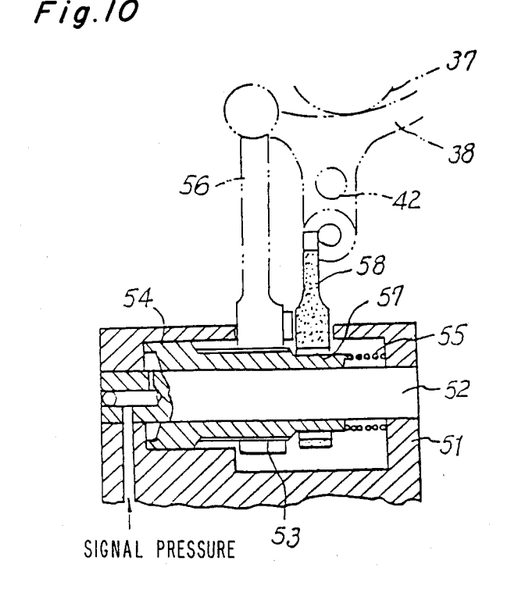
FIG. 10 is a schematic sectional view of the manual operation mechanism in the second embodiment.

FIG. 10 shows an example of manual control mechanism to be used when a malfunction occurs in the automatic control system. This manual control mechanism will not operate other than for malfunction of the automatic control system. A sleeve 54 having a spline 53 is slidably mounted on a guide shaft 52 which is supported by a support 51 and crossing perpendicularly to the moving direction of the ring 38. The sleeve 54 is urged with a spring to a side. A manual lever 56 engages with the spline 53 of the sleeve 54. A control lever 58 engaged with the ring 38 is provided with a hole 57 having a spline on its peripheral surface. The control lever 58 is rotatably and slidably mounted on a shaft part of the sleeve 54, and said spline of the hole 57 can be engaged with the spline 53 by sliding the sleeve 54.

An end section of the sleeve 54 opposite to the side being urged with the spring 55 is supplied with signal pressure for controlling the speed ratio control valve 45 of the electrohydraulic control device 41.

When a malfunction occurs in the control system, the electromagnetic valve 46 does not operate and signal pressure increases, the hydraulic pressure moves the sleeve 54 against urging force of the spring 55 to the right in FIG. 10. Then, the spline 53 engages with the spline of the hole 57 of the control level 58. The manual level 56 and the control lever 58 are integrally put together. By turning the manual lever 56 around the guide shaft 52, the control lever 58 moves the ring 38 to perform speed change operation. In normal operation in which the signal pressure is low, the sleeve 54 is pressed toward the left by the spring 55, the control lever 58 is freely rotatable on the shaft part of the sleeve 54 and does not disturb movement of the ring 38 for automatic control. The manual lever 56 can be provided with simple indications such as Start, Acceleration and Stop, or with a light detent.

Figure 11:
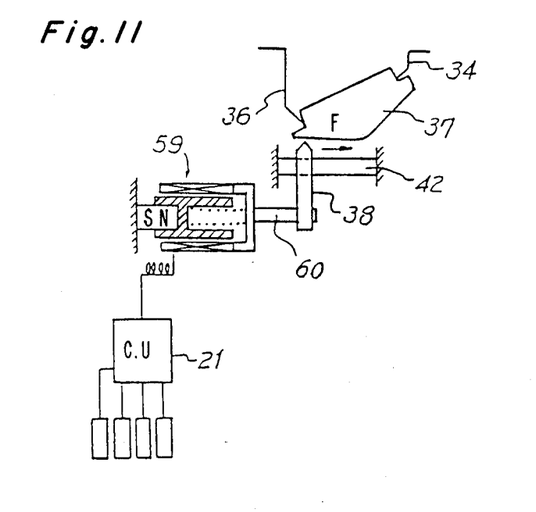
FIG. 11 is a schematic view showing a modification example of the second embodiment of the present invention.

The frictional type continuously variable transmission mechanism 33 can also be controlled electrically. Referring to FIG. 11 showing an example of electrical control, a moving part 60 of a force motor 59 is connected to the ring 38, and a circuit to calculate control current supplied to the force motor 59 is provided in lieu of the duty ratio calculation circuit 224 in the first embodiment of the present invention. Current obtained by the above circuit operates the force motor 59, and the moving part 60 is moved back and forth to move ring 38 to vary the speed ratio.

As described in the foregoing, the second embodiment of the present invention provides almost same effects as those obtained in the first embodiment, and by the function of the transmission type continuously variable mechanism 33, clutch control operation at the start of a vehicle can be simplified or eliminated.

We claim:
1. A continuously variable transmission apparatus for a vehicle having a slip type clutch disposed between a drive shaft of an engine and an input shaft of a continously variable transmission mechanism, comprising a torque detecting device to detect torque of said engine, an engine speed detecting device to detect rotational speed of said engine, an output shaft speed detecting device to detect rotational speed of an output shaft of said slip type clutch, a vehicle speed detecting device to detect running speed of the vehicle, a slip clutch control device, a continuously variable transmission mechanism control device, and an electronic control device to control said continuously variable transmission mechanism and said slip type clutch according to signals from said detecting devices, means for determining an actual amount of slip of said slip type clutch from output signals of said engine speed detecting device and said output shaft speed detecting device, means for calculating a reference slip amount for said slip type clutch according to running conditions of the vehicle, means for determining a slip amount difference between said reference slip amount and said actual amount of slip, a duty ratio calculation circuit connected to said means for determining a slip amount difference for producing a control signal based on said slip amount difference, said slip clutch control device being connected to said duty ratio calculation circut for said slip type clutch to control said slip type clutch according to said slip amount difference so said actual amount of slip becomes closer to said reference amount of slip, means for determining an actual speed ratio of said continuously variable transmission mechanism from an output signal of said engine speed detecting device or said output shaft speed detecting device and an output signal of said vehicle speed detecting device, a reference speed ratio calculation circuit connected to said duty ratio calculation circuit and to said vehicle speed detecting device for determining an optimum speed ratio of said continuously variable transmission mechanism according to current driving conditions according to duty ratio and vehicle speed; speed ratio difference determining means connected to said reference speed ratio calculation circuit and to said means for determining actual speed ratio for determining a speed ratio differnce between a reference speed ratio set according to control signal of said control device for said slip type clutch and a signal from said engine speed detecting device or said vehicle speed detecting device and said means for determining actual speed ratio, said continuously variable transmission mechanism control device being connected to said reference speed calculation circuit and to said speed ratio difference determining circuit for controlling said continuously variable transmission mechanism according to said speed ratio difference and according to said slip amount difference.

2. A continuously variable transmission apparatus for a vehicle as claimed in claim 1, wherein said continuously variable transmission mechanism is a belt type continuously variable transmission mechanism.

3. A continuously variable transmission apparatus for a vehicle as claimed in claim 1, wherein said continuously variable transmission mechanism is a stepless frictional type continuously variable transmission mechanism.

4. A continuously variable transmission apparatus for a vehicle as claimed in claim 1, wherein said reference amount of slip is set according to signal from said torque detecting device and signal from said engine speed detecting device or said vehicle speed detecting device.

5. A continuously variable transmission apparatus for a vehicle as claimed in claim 1, wherein said torque detecting device is a valve opening sensor to detect opening of a throttle valve disposed in an intake system of said engine.

6. A continuously variable transmission apparatus for a vehicle as claimed in claim 1, wherein said reference amount of slip is set according to signal from said torque detecting device and signal from said engine speed detecting device or said vehicle speed detecting device.

7. A continuously variable transmission apparatus for a vehicle as claimed in claim 1, wherein said torque detecting device is a valve opening sensor to detect opening of a throttle valve disposed in an intake system of said engine.

8. The continuously variable transmission apparatus defined in claim 1 further including a control device for controlling belt pressing force of a driven pulley of a belt type continuously variable transmission mechanism according to a control signal of said slip clutch device.

9. The continuously variable transmission apparatus defined in claim 8 further including a means for controlling belt pressing force of a driving pulley of said belt type continuously variable transmission mechanism according to said speed ratio difference.

* * * * *